(12) United States Patent
Chang et al.

(10) Patent No.: US 9,227,354 B2
(45) Date of Patent: Jan. 5, 2016

(54) FEEDBLOCK MULTIPLIER WITH THICKNESS GRADIENT VARIATION, FEEDBLOCK SYSTEM, METHOD, AND RELATED MULTILAYER STRUCTURE

(75) Inventors: Jen-Huai Chang, Taoyuan County (TW); Wen-Cheng Wu, Taoyuan County (TW); Chao-Ying Lin, New Taipei (TW)

(73) Assignee: EXTEND OPTRONICS CORP., Taoyuan County (TW)

( * ) Notice: Subject to any disclaimer, the term of this patent is extended or adjusted under 35 U.S.C. 154(b) by 287 days.

(21) Appl. No.: 13/464,995

(22) Filed: May 6, 2012

(65) Prior Publication Data

US 2013/0292871 A1    Nov. 7, 2013

(51) Int. Cl.
*B29C 47/06* (2006.01)
*B29C 47/56* (2006.01)
*B29C 47/14* (2006.01)
*B29C 47/70* (2006.01)

(52) U.S. Cl.
CPC ............... *B29C 47/06* (2013.01); *B29C 47/145* (2013.01); *B29C 47/56* (2013.01); *B29C 47/707* (2013.01)

(58) Field of Classification Search
CPC ...... B29C 47/06; B29C 47/061; B29C 47/70; B29C 47/702; B29C 47/707; B29C 47/56
USPC .......... 425/133.5, 462, 463, 464; 264/173.12, 264/173.16, 171.1, 173.11, 173.17
See application file for complete search history.

(56) References Cited

U.S. PATENT DOCUMENTS

| | | | |
|---|---|---|---|
| 5,094,788 A | 3/1992 | Schrenk et al. | |
| 5,389,324 A | 2/1995 | Lewis et al. | |
| 6,261,674 B1 * | 7/2001 | Branham | B29C 47/0021 428/218 |
| 6,696,142 B2 * | 2/2004 | Baer et al. | 428/212 |
| 6,707,885 B2 * | 3/2004 | Wimberger-Friedl | B29C 47/0019 378/154 |
| 6,808,579 B1 * | 10/2004 | Pulford | B29C 47/0019 156/123 |
| 6,984,439 B2 * | 1/2006 | Topolkaraev | A61F 13/15252 428/182 |
| 7,108,816 B2 * | 9/2006 | Wimberger-Friedl | H01L 51/5237 264/173.11 |
| 7,936,802 B2 | 5/2011 | Singer et al. | |
| 8,215,940 B2 * | 7/2012 | Winroth | B29C 47/0021 264/241 |
| 8,679,290 B2 | 3/2014 | Cruz | |
| 2003/0201565 A1 * | 10/2003 | Cloeren | B29C 47/0021 264/173.16 |
| 2010/0047558 A1 * | 2/2010 | Schiraldi | B29C 47/0021 428/325 |

\* cited by examiner

*Primary Examiner* — Timothy Kennedy
(74) *Attorney, Agent, or Firm* — Li & Cai Intellectual Property (USA) Office

(57) ABSTRACT

Disclosed are a feedblock multiplier with thickness gradient variation, a feedblock system, a method, and multilayer structure made by the method. The feedblock multiplier combines the functionalities of feedblock and multiplier conventionally used for producing the multilayer structure. The feedblock multiplier includes an input section for feeding fluid materials. A feedblock section is included for dividing the fluid delivered into multiple channels correspondingly. The fluids in the channels are segmented into two or more fluid segments by a segmenting section. The each fluid segment is delivered through corresponding channel-conversion section with thickness-gradient variation in the feedblock multiplier. Each channel-conversion section includes multiple channels with configurable positions. The fluids are then combined in a multiplier section for producing the multilayer structure with overlapped layers. The multilayer structure is outputted from an extruding section.

8 Claims, 17 Drawing Sheets

FEEDBLOCK MULTIPLIER WITH THICKNESS GRADIENT VARIATION, FEEDBLOCK SYSTEM, METHOD, AND RELATED MULTILAYER STRUCTURE

BACKGROUND OF THE INVENTION

1. Field of the Invention

The present disclosure relates to a feedblock multiplier with thickness-gradient variation, a system, method and its structure made of, more particularly to a design-flexible feedblock multiplier combining functions of feedblock and multiplier and the method for manufacturing the same.

2. Description of Related Art

The conventional multilayer structure applied to an optical system or any specified purpose is constituted of a plurality of stacked thin films. Any layer inside the structure is designed to be the thin film having various physical properties such as reflective index among the films. Since the multilayer structure is applied to the optical system, the multilayer may be configured to allow the light with a specified wavelength range to pass or block it. This type of optical component with multiple optical films may be assembled by high polymers. In particular, a co-extrusion method is applicable to produce the multilayer for various purposes. Reference is made to FIG. 1.

FIG. 1 shows a schematic diagram of a co-extruding machine. Materials are separately input to the machine via a first feeding port 100 and a second feeding port 102. A pre-processing step is firstly performed after mixing the materials. The pre-processing step is such as cleaning, baking including moisture control, and impurity removing. The materials undergoing the pre-processing step are then separated at first time through the first feedblock unit 104, and the material are transported via different channels. In the current example, a second feedblock unit 110 is made to process a second feedblock via the second feedblock unit 110. Therefore, the materials are layer-by-layer mixed, and the transported through the multiple channels.

After that, the fluid after the multiple channels then undergoes a multiplying unit 106 for producing multiple layers. In the meantime, the fluid is directed to a surface material feeding port 108, which forms a protective layer for the structure. Through the multiplying unit 106, the number of the original layers is doubled. The fluid is then compressed through a multilayer extruding unit 111, and output via an extrusion die 112. This extrusion die 112 is configured to uniform the temperature and thickness of the extruded materials, and simultaneously produce the final product with a specified thickness and shape.

After that, a shaping unit 114 is used to fine tune the structure, the product's thickness and direction of transportation of the semi-finished product from the extrusion die 112. A set of rolls 116 flattens the multilayer structure and transports it to a next platform. A stretching roll set 118 is used to perform a uniaxial stretching process onto the multilayer structure by stretching mechanics. A stretching unit 120, which performs a uniaxial or biaxial stretching, may be accompanied with a heating unit 122 for heating the multilayer structure. In consequence the structure is modeled and de-stressed based on its design. The mechanical or thermal/optical properties of the multilayer may be improved. A collecting unit 124 is lastly collected to be the product.

One of the examples of the feedblock in a co-extruder is referred to the conventional way shown in FIG. 2. The shown feedblock 2 includes multiple feeding ports 20, 21, 23, 24 which are receiving different materials. For example, the fluid high polymers are input to a feedblock unit 27 via the feeding ports 20, 21, 23, 24. The mechanics of the feedblock unit 27 is to split the materials into multiple layers, and output from an outlet 22 through extrusion.

The number of the multilayer made by the conventional feedblock is equal to the number by multiplying the inlet number and the number of channels of the feedblock.

FIG. 3A and FIG. 3B schematically show an operational example and the device of a conventional multiplier.

In FIG. 3A, the example describes the operation of multiplier. Numeral 301 indicates the initial input. The input material is split into several transmitting portions, such as four splitting materials 303a, 303b, 303c, and 303d in this example. As required, the relative relations among the input materials 303a, 303b, 303c, 303d may be rearranged as shown. The original inputs 303a, 303b, 303c, 303d are changed to up-to-bottom order such as shown 303c, 303a, 303d and 303b.

The ordered structure as required may be extended to the longer structure as shown in the figure that is the multiplied multilayer (305). The multilayer structure 307 is formed after extrusion.

FIG. 3B shows a conventional multiplier in one of the examples of the mentioned multiplier.

The shown multiplier may be installed after the feedblock. The input material zone 31 shows the input material is split and entering the device via the feedblock inlets 311, 312, 313, and 314. The material in the inlets is transported through different channels. As the material reaching the shown conversion zones 311', 312', 313' and 314', the relative positions of channels may be converted as required. When the material reaches the multiplying outlet 32, the number of layers can be multiplied by four other than the change for the relative positions. The final product is then output after extrusion.

In the conventional technology, the polymers may be much stable and uniform as flowing inside the super-multilayer feedblock, such as a disc-shaped super-multilayer feedblock, without thickness, width, or length gradient variation. The stable flowing material may not easily result in too much different velocity, and in theory the flowing stability of the each channel may be great. Therefore the thickness of final output multilayer can be much uniform, and the conventional color spots and blocks can be effectively reduced.

However, in fact, the super-multilayer feedblock with thickness, width or length gradient variation is configured to make the channels with thickness, width or length differences during manufacturing procedure. Since the thickness, width or length of the conventional super-multilayer channels exist variation, the stresses for the internal flow of the channels may be variant. The too much stress variation inside the channels may result in unstable multiple channels as extruding the films. The multilayer may have non-uniform thickness, color spots, or color stripes because of the thickness-gradient variation of the feedblock.

SUMMARY OF THE INVENTION

For in one method effectively producing the multilayer structure at one time, disclosed is a feedblock multiplier with thickness-gradient variation. The feedblock multiplier combines the functions of feedblock and multiplying into one device, which is applicable to a co-extrusion procedure.

The main portions of the feedblock multiplier are an input section for receiving the input material, and that is the portion of the feedblock multiplier of the invention receiving the material.

A feedblock section is further incorporated to linking the input section. The feedblock section separates the input material prepared for producing the multilayer structure into several flows through channels. As required, the feedblock section also transports the every layer of material to the corresponding channel. The fluid is then transported to a segmenting section of the feedblock multiplier. The segmenting section is preferably disposed at an output end of the feedblock section. The segmenting section segments the fluids transmitted through the channels into two or more fluid segments when it receives the fluids. The every fluid segment includes the segmented fluids over the channels.

Next, the fluids separately flow into two or more channel-conversion sections of the feedblock multiplier. Each channel-conversion section includes a plurality of channels after segmenting. The segments are combined in the multiplier section, which also stacks the plurality of channels. Stacking the channels includes configuring the relative positions of the channels. The output is exemplarily the multilayer structure with a plurality of stacked materials. The last portion of the feedblock multiplier has an extruding section for co-extruding the multilayer structure.

In the feedblock multiplier with thickness-gradient variation of an exemplary example, the segmenting section particularly segments the fluids in the plurality of channels into two fluid segments. Both two segments have the same number of channels. The cross-sectional surface of the segmenting section may be a non-linear irregular surface, such as a bevel or a curved surface. The two fluid segments through the irregular cutting surface of the segmenting section may be disposed at the last portion of the feedblock multiplier. The output of the feedblock multiplier forms the claimed multilayer structure with thickness-gradient variation.

The channel-conversion section(s) (for example two) of the feedblock multiplier may have the same number of channels with the number formed by the segmenting section. In particular, the channels in the channel-conversion section are featured that the thickness of every channel has gradient variation. The channels are featured that they have their own relative transporting positions and can be changed as combined in the multiplier section as required.

In accordance with the embodiment of the present invention, the feedblock multiplier with thickness-gradient variation is manufactured by the method as follows.

The first step in the method is to input the materials for producing the multilayer structure. The materials are transported to the feedblock multiplier. A feedblock section of the device splits the materials into fluids of a plurality of channels. A segmenting section then segments the fluids into two or more fluid segments according to a segmenting type. Every fluid segment includes the fluids in the segmenting channels.

The two or more fluid segments separately flow over the two or more channel-conversion sections. The fluids in the channels of the channel-conversion section will be combined in a multiplier section. The fluids over the channels may be rearranged to have different relative positions as required. The fluids are then stacked in the multiplier section and the stacked matter is output through the extruding section. The multilayer structure is finally made by forming the stacked multiple layers of materials.

The thicknesses of channels of the mentioned channel-conversion section are gradually changed and serve the layers of the final multilayer structure to have different thicknesses.

In one further embodiment, the claimed feedblock multiplier may be combined one front end feedblock, so as to establish a feedblock system. More layers of the multilayer structure can be made accordingly.

The embodiment of the present invention further includes a multilayer structure made by the above-described method.

BRIEF DESCRIPTION OF THE DRAWINGS

The accompanying drawings which are incorporated in and which constitute a part of this specification illustrate several exemplary constructions and procedures in accordance with the present invention and, together with the general description of the invention given above and the detailed description set forth below, serve to explain the principles of the invention wherein.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The disclosure is related to a feedblock multiplier with thickness-gradient variation, a method for implementing the feedblock multiplier, and a multilayer structure made by the method. The feedblock multiplier with thickness-gradient variation mechanically combines the functions respectively made by a feedblock and a multiplier. The claimed apparatus is flexibly designed as required. The apparatus efficiently achieves the better feedblock and multiplier. Furthermore, disclosure is also related to a method for manufacturing the multilayer structure made by the feedblock multiplier with thickness-gradient variation.

It is worth noting that the multilayer structure made by the feedblock multiplier includes an aspect of thickness-gradient variation. However, the reflectivity or transmittance of structure may not reach the required distribution of the bandwidth and wavelength if a thickness of the films in the multilayer structure has no gradient variation. Therefore, the related application may be restricted. One of the motivations of the present invention is to accomplish an effect of gradient thicknesses made by an oblique cutting of the feedblock multiplier with thickness-gradient variation. Reference is made to FIG. 11, which schematically shows an optical film reaching the required bandwidth or transmittance.

Figure 1:
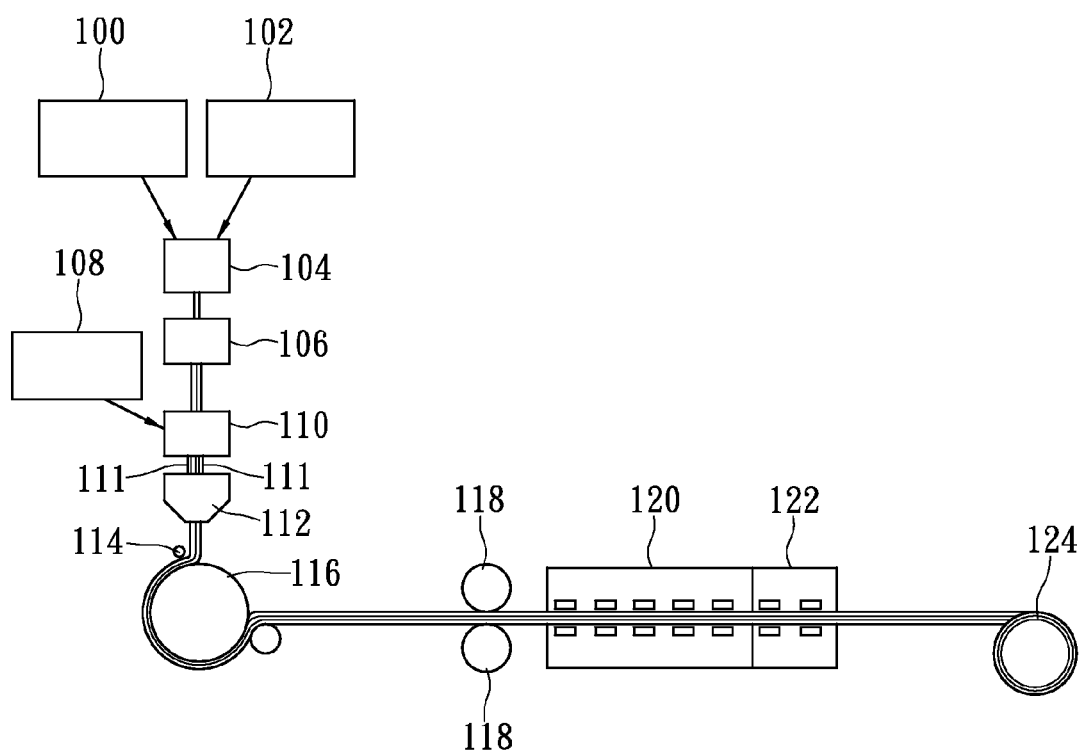
FIG. 1 shows a schematic diagram of a conventional arrangement of co-extruding procedure.
Figure 2:
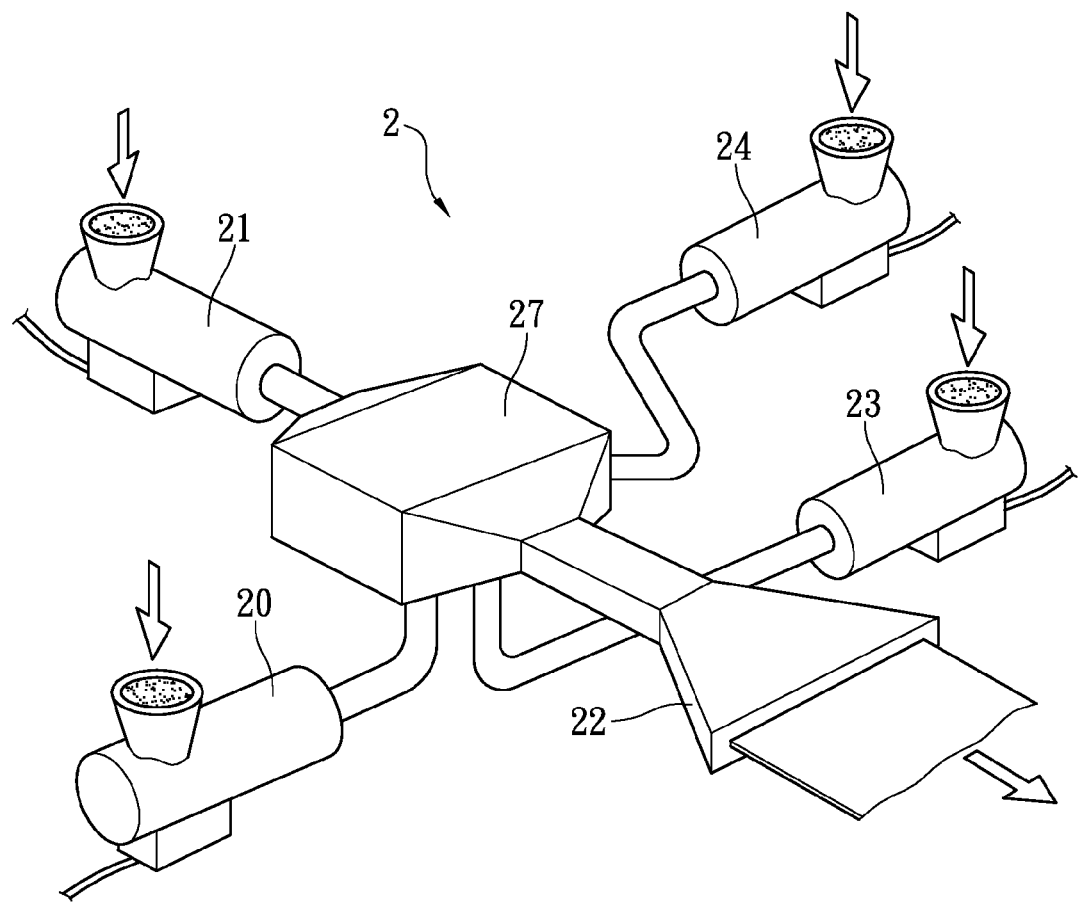
FIG. 2 shows a schematic diagram of a conventional feedblock.
Figure 3A:
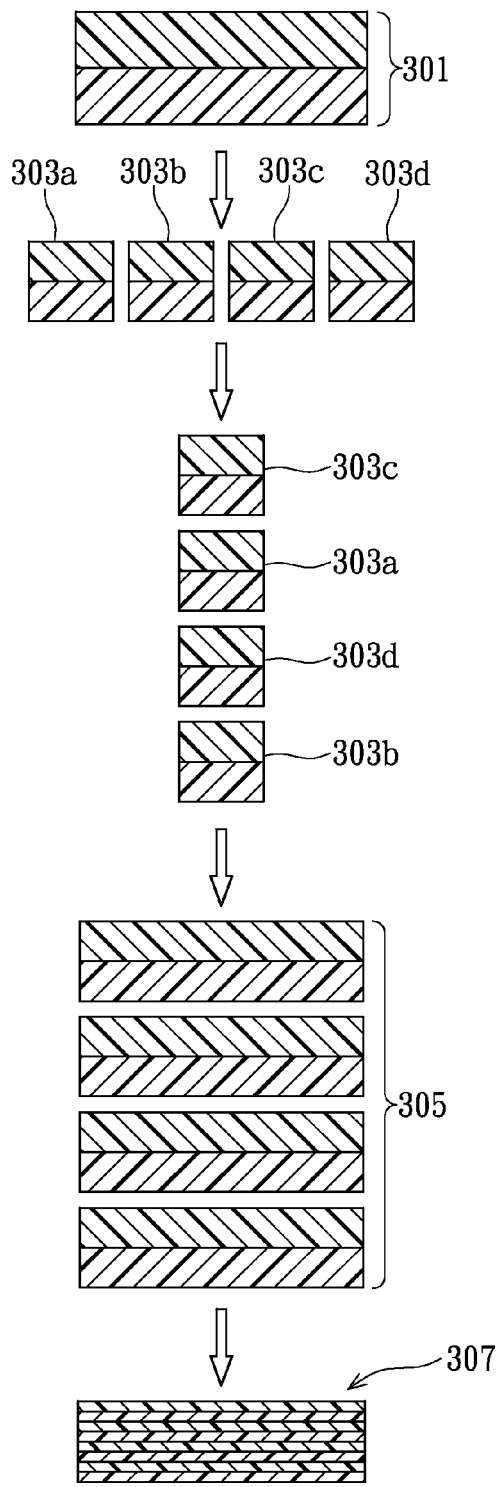
FIG. 3A schematically describes the operation of the conventional multiplier.
Figure 3B:
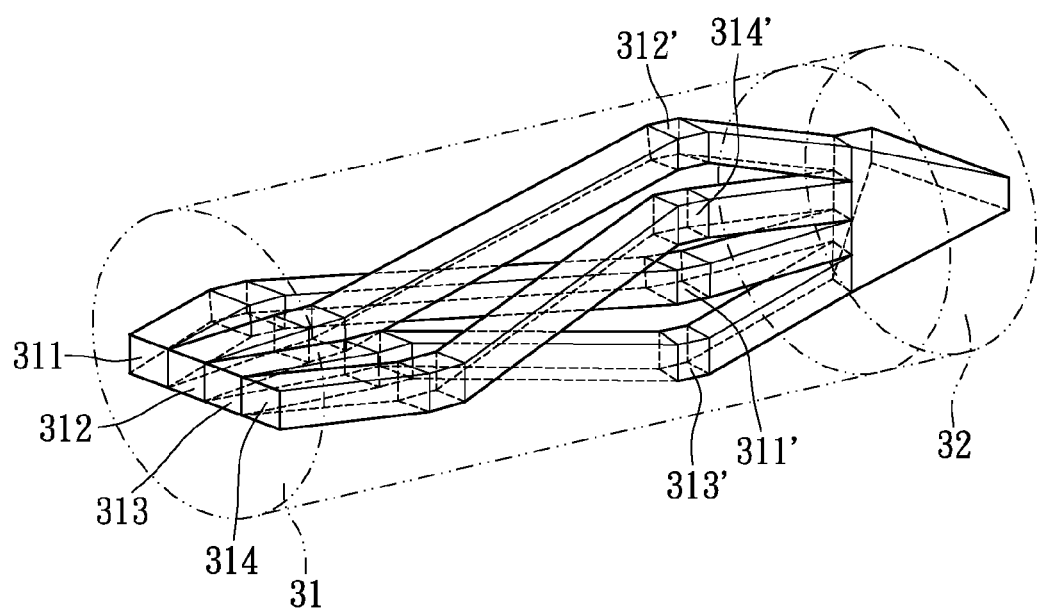
FIG. 3B is a schematic diagram of the conventional multiplier.
Figure 4:
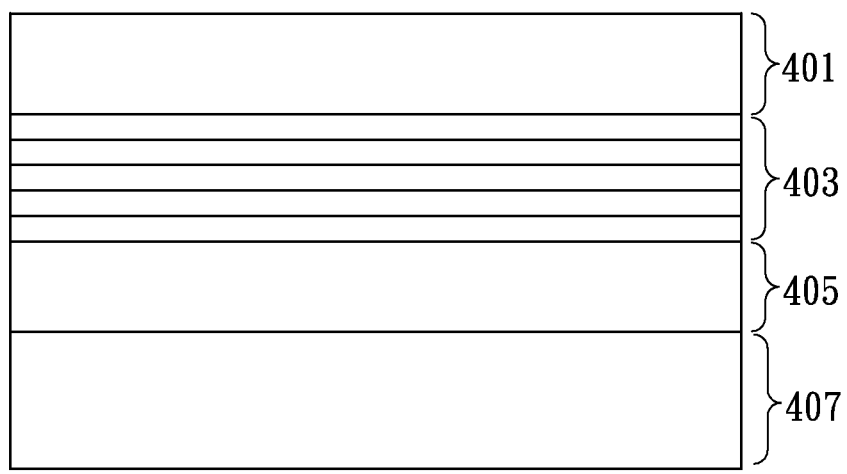
FIG. 4 shows a schematic diagram of a multilayer structure.

Reference is made to FIG. 4 schematically showing structure of one of the conventional multilayers. According to requirement made by any request, thicknesses and functionalities of the layers are provided to form the multilayer structure, for example the optical film for optical system, or other uses such as the explosion-proof multilayer structure.

The multilayer structure of the present example includes a first functional layer 401, which may be configured to meet protective purposes such as waterproof, absorption of UV light or specific wavelengths of light, antireflection, structural strengthening, scratch-resistant, and/or impact resistant.

The layers in multilayer structure 403 may have the same or not the same thicknesses. The variation of the thicknesses may be produced by a co-extrusion process. The multilayer structure 403 is especially made by a plurality of high-polymeric layers. The adoptive materials are, but not limited to, such as Poly(Methyl methacrylate) (PMMA), Polycarbonate (PC), (Methyl methacrylate)Styrene (MS), and PolyStyrene (PS), and at least one selected from the groups consisting of Poly(Ethylene Terephthalate) (PET), Poly(Ethylene Naphthalate) (PEN), and Polypropylene (PP), or their co-polymer.

Furthermore, a second functional layer 405 may be designed to enhance the functionality made by the whole structure. The last layer is a substrate layer 407.

Figure 5:
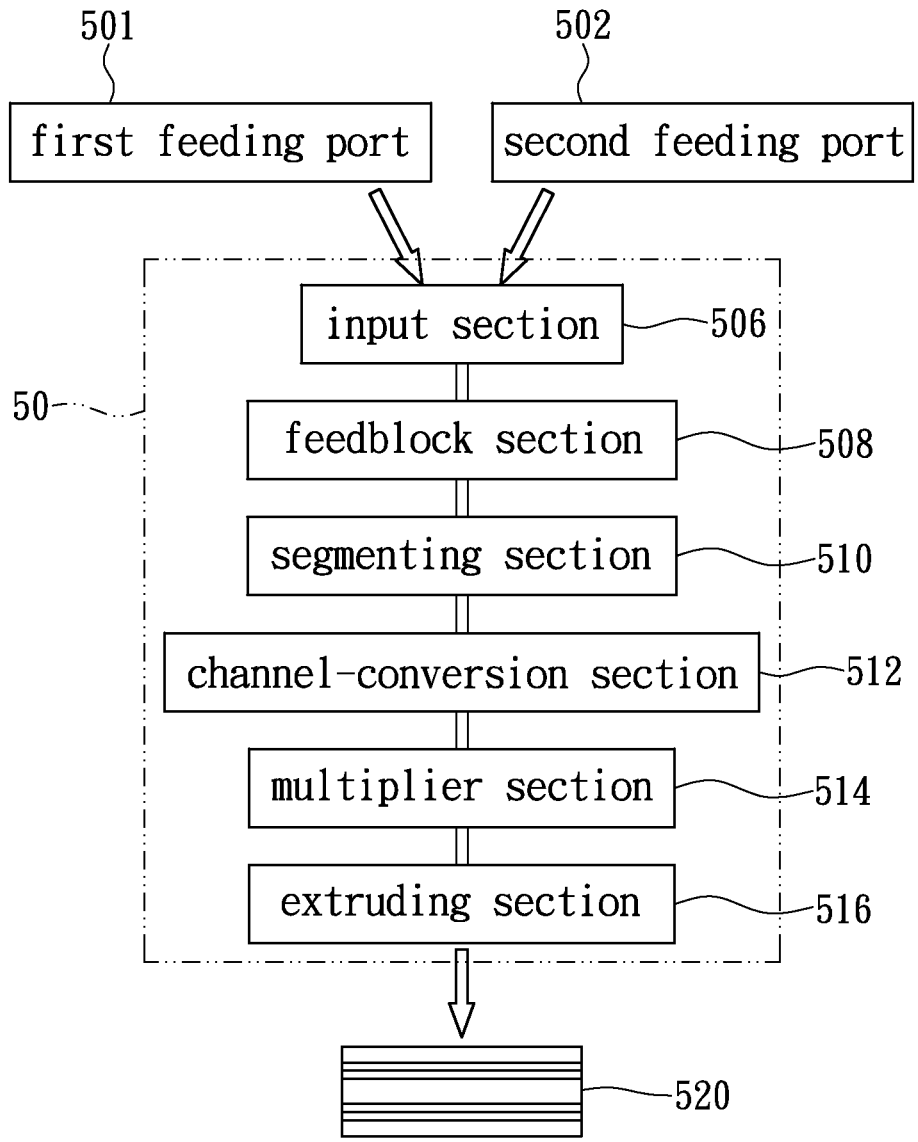
FIG. 5 is a schematic diagram of the feedblock multiplier with thickness-gradient variation in one embodiment of the present invention.

The disclosure related to the feedblock multiplier with thickness-gradient variation is particularly configured to manufacture the multilayer structure, especially the structure with design of variant thicknesses. Reference is made to FIG. 5, which shows a schematic diagram of the feedblock multiplier.

This feature describes the detail of the portions of the feedblock multiplier. The major portions of the feedblock multiplier are an input section 506, a feedblock section 508, a segmenting section 510, a channel-switching section 512, a multiplier section 514, and an extruding section 516

The feeding may be one or more materials in combination. Before the input section 506, a first feeding port 501 and a second feeding port 502 are respectively served to feed the same or different materials into the feedblock multiplier 50.

The input section 506 of the feedblock multiplier 50 allows one or a plurality of materials corresponding to the multiple layers of the final product to enter the feedblock multiplier 50. The materials are flowing fluids.

The feedblock section 508 is structurally coupled to the input section 506. The feeding materials are divided into a plurality of fluids flowing in multiple channels through the feedblock section 508. The fluids with the materials are transported through their corresponding channels.

Further, a segmenting section 510 coupled to the output end of the feedblock section 508 of the feedblock multiplier 50 is included. When the fluids over the plurality of channels reach this segmenting section 510, the fluids are segmented into two or more fluid segments. Each fluid segment forms the segmented fluids over the channels. As required, the segmenting section 510 may be configured to have various types of the cross section, such as the alternatives shown in FIG. 11 or FIG. 12.

The segmenting section 510 is coupled to the channel-switching section 512. The configuration of the two or more cross sections of the segmenting section 510 defines the number of channel-switching sections 512. Each of the channel-switching sections 512 are composed of a plurality of segmented channels. The fluids over the segmented fluid segments are respectively transported to the different channel-switching sections 512.

The multiplier section 514 included in the feedblock multiplier is coupled to the mentioned channel-switching section 512, and is used to combine the outputs of the channel-switching sections 512. The channels through the channel-switching sections 512 are stacked, and used to output the multilayer structure having a plurality of layers of materials. The multilayer structure 520 is consequently produced by means of co-extruding through the extruding section 516 coupled to the multiplier section 514.

Structurally, the various thicknesses of the fluids over the difference channels form the various pressures within the channel-switching section 512 when the fluids flow therein. However, the problem caused by the various pressures within the section 512 may be overcome through structural design. The multiplier section 514 is disposed onto the rear portion of the feedblock multiplier. The multiplier section 514 is configured to arrange the order of the stacked thicknesses, and served to conduct fine adjustment.

Figure 6:
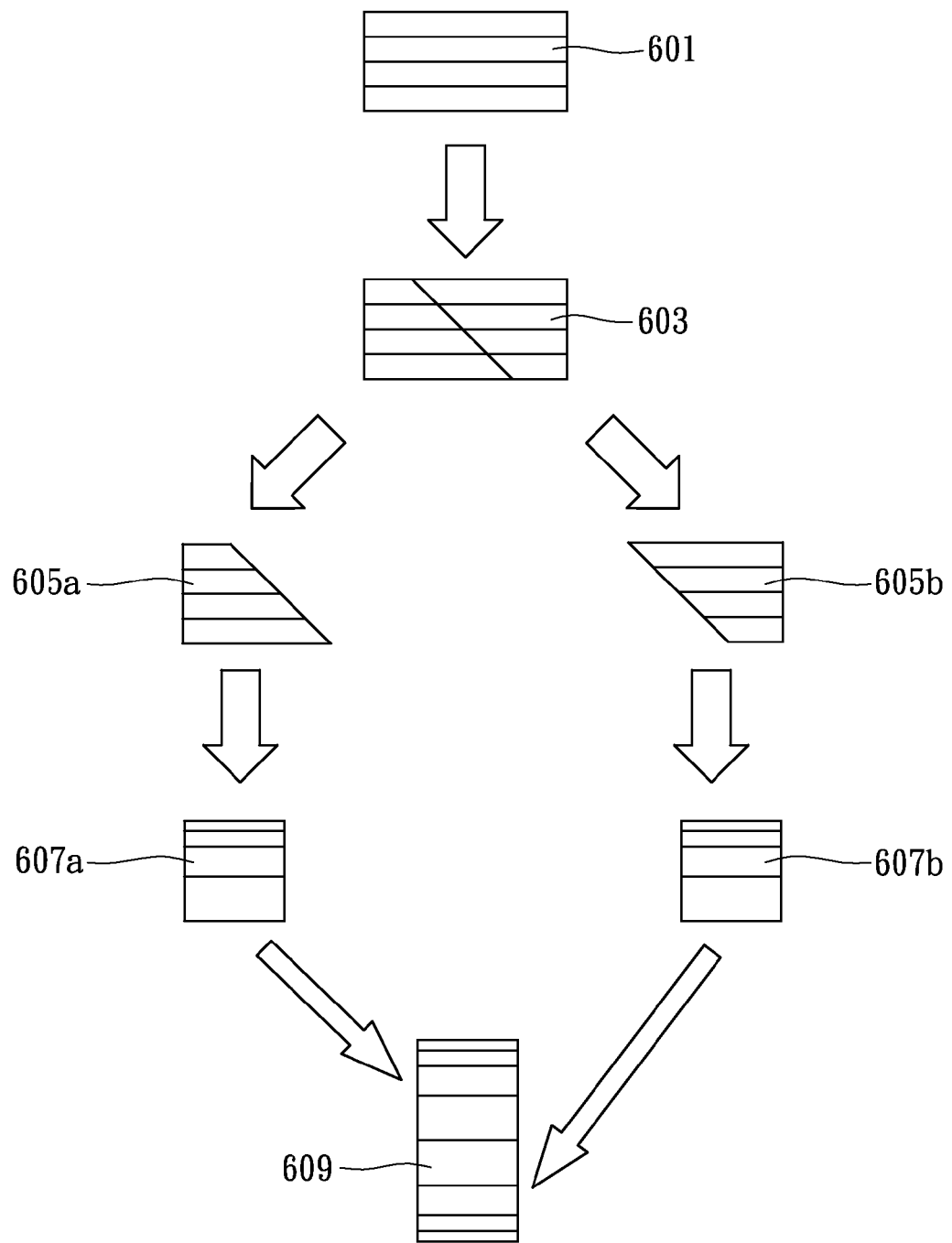
FIG. 6 is a process illustrating the method for manufacturing the feedblock multiplier with thickness-gradient variation according to one embodiment of the present invention.

Reference is made to FIG. 6 describing the process of the multilayer structure manufactured by the feedblock multiplier with thickness-gradient variation.

In the beginning of the process, an initial multilayer material 601 is prepared. Then four layers of the material are produced through a feedblock process. The segmenting section 510 is served to segment the material and form bevel cutting structure 603. The example shows a bevel surface. The segmenting configuration defines the thickness of the multilayer structure in the final product.

In the present embodiment, the bevel surface causes the structure being divided into a first segmenting structure 605a and a second segmenting structure 605b. A cross section is formed on both the structures 605a and 605b. Both the first segmenting structure 605a and the second segmenting structure 605b may have the same number of the layers.

The first segmenting structure 605a and the second segmenting structure 605b are respectively transported over the different channel-switching sections. However, the two structures 605a and 605b have different volumes through the bevel structure. After the channels are switched, the each structure is specified to have arrangement of the layers with various thicknesses. The shown first extruding structure 607a and the second extruding structure 607b are presented as the outputs of the two structures 605a and 605b.

In one further embodiment described in this disclosure, the thickness of the extruded product may be configured by introducing the thickness-gradient variation of the channels of the mentioned channel-switching section. That is, the proportion of thicknesses among the layers of the final product may be defined by varying the thickness ratio of channels of the channel-switching section.

After that, the multiplier section is served to stack the first extruding structure 607a and the second extruding structure 607b to form the extruding product 609.

Figure 7:
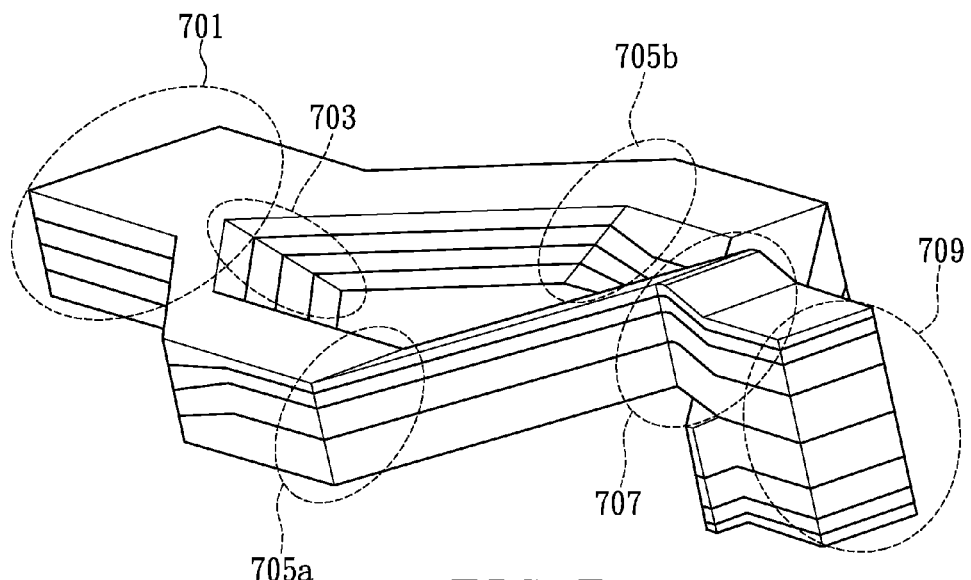
FIG. 7 shows a schematic diagram of the feedblock multiplier in accordance with one embodiment of the present invention.

In FIG. 7, an exemplary embodiment of the feedblock multiplier with thickness-gradient variation in accordance with the present invention is shown. In a first stage, a shown feedblock multiplier allows one or more materials to be input through an input section.

A feedblock section 701 is coupled to the input section. The feedblock section 701 in the present example divides the one or more kinds of materials into several fluids of the channels. This example, but not limited to, provides four channels with the same thickness. The feeding materials are then transported through the four channels. The material over each channel is then delivered to the corresponding channel of the segmenting section 703.

The segmenting section 703 is particularly disposed at the output end 設 of the feedblock section 701. The fluids over the mentioned four channels are then segmented into one or more fluid segments depending on the configuration of the cross section thereof. The present example allows the fluids to be segmented to two fluid segments. In which, each fluid segment includes the segmented fluids over the four channels. The two segments are exemplarily transported over a first channel-switching section 705a and a second channel-switching section 705b respectively.

The first channel-switching section 705a and the second channel-switching section 705b are coupled to the segmenting section 703. According to one of the embodiment of the disclosure, the number of channel-switching sections is depending on the configuration of the cross section of the segmenting section 703. The each fluid segment is flowing over its corresponding channel-switching section.

The fluid segments passing through the two channel-switching sections 705a, 705b are then combined in a multiplier section 707. The entrance of the multiplier section 707 is coupled to the first channel-switching section 705a and the second channel-switching section 705b, and is served to stack the channels over the channel-switching sections for outputting multilayer structure with multiple layers. The final product is consequently from an extruding section 709.

As the figure shows, the outlet of the extruding section 709 is formed to have the structure implementing the multilayer structure with thickness-gradient variation. In accordance with the present invention, the variation of the thicknesses among the layers of the multilayer structure is based on the design of the cross section of segmenting section 703. Furthermore, the channels within the above-described first channel-switching section 705a and the second channel-switching section 705b may also be designed to have thickness-gradient variation, and therefore causes the implementation of the final multilayer structure.

Figure 8:
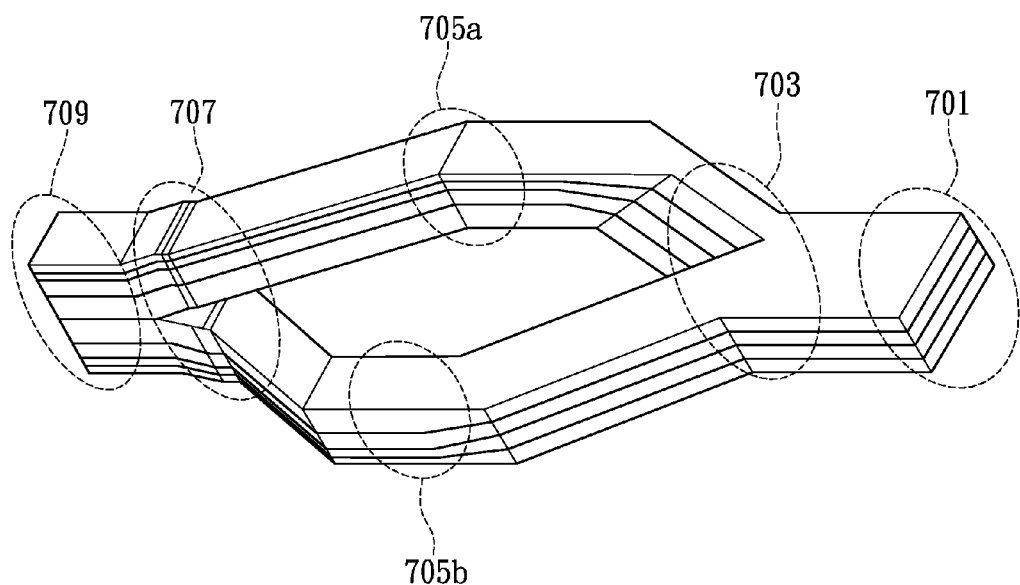
FIG. 8 schematically shows one further embodiment of the feedblock multiplier of the present invention.

On another point of view of the feedblock multiplier in accordance with the present invention is shown in FIG. 8 in view of the structure shown in FIG. 7.

In the schematic diagram of FIG. 8, the feedblock multiplier exemplarily includes a feedblock section 701 for feeding the materials. The type of this feedblock section 701 determines the number of the base layers of the multilayer structure. The segmenting section 703 segments the channels into two sections, and accordingly defines a value of multiple for developing the base layers of the multilayer structure. The configuration of the cross section thereof then defines the variation of the thicknesses of the layers of the multilayer structure.

The structure behind the mentioned channels is separated to the first channel-switching section 705a and the second channel-switching section 705b. These two channel-switching sections are developed to have different directions, and combined at the multiplier section 707 afterwards. The multiplier section 707 defines an order among the channels after switching the channels. The final product therefore has its unique arrangement of the layers. Furthermore, the channels within the channel-switching section may be configured to have its own thickness-gradient variation. The variation of the thicknesses of the layers of the final product is based on the order, the thickness variation, and the configuration of the channels within the channel-switching sections. The extruding section 709 is coupled to the multiplier section 707 and used to output the extruded product.

Figure 9:
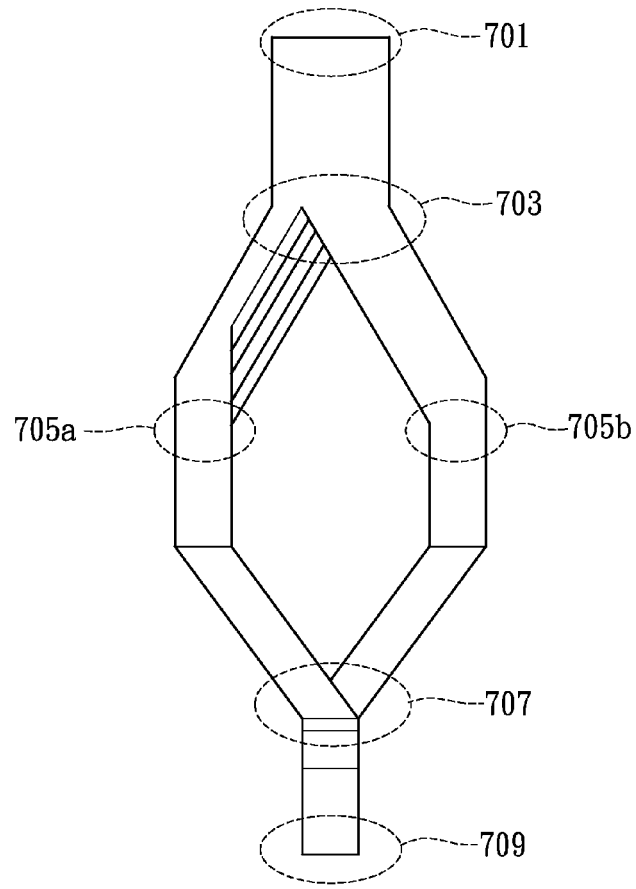
FIG. 9 schematically shows one embodiment of the feedblock multiplier of the present invention.

FIG. 9 shows a schematic diagram from a top view of the feedblock multiplier of the present invention. The shown first channel-switching section 705a and the second channel-switching section 705b serve to transport the fluids to different directions and converged at the multiplier section 707.

Figure 10:
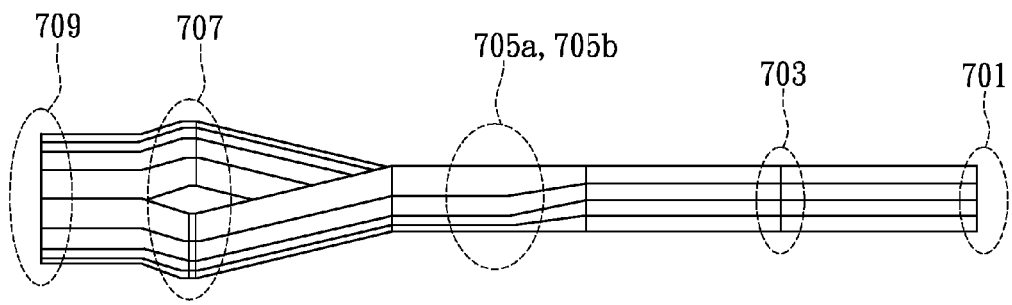
FIG. 10 schematically shows another embodiment of the feedblock multiplier of the present invention.

A side view of the feedblock multiplier is schematically shown in FIG. 10. The configuration of thicknesses of the device is apparently described.

In the present example, the feedblock section 701 includes several channels with the same thickness. The fluids afterwards enter the segmenting section 703, and respectively flow to the first channel-switching section 705a and the second channel-switching section 705b. The channels within both the first channel-switching section 705a or/and the second channel-switching section 705b may be configured to have thickness-gradient variation for altering the final product.

As the fluids entering the multiplier section 707, the fluids over the channels of the first channel-switching section 705a and the second channel-switching section 705b are stacked. The final product is output from the extruding section 709.

The segmenting section is functioned based on the configuration of the cross section thereof in accordance with the embodiment of the feedblock multiplier with thickness-gradient variation. The cross section may have an irregular surface in an exemplary embodiment.

Figure 11A:
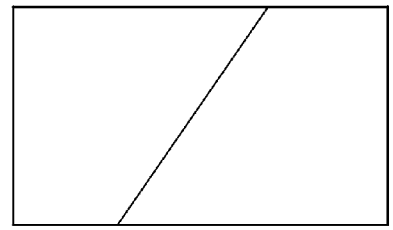
FIGS. 11(A)(B)(C)(D) show the schematic diagrams of the segmenting types of the feedblock multiplier in one embodiment of the invention.

The cross section shown in FIG. 11(A) is exemplarily a bevel. The cross section allows the fluids with different volumes to pass over the channels at the same time. The segmenting section defines the multiple of layers (e.g. double) in the manufacture, and also effectively controls the thickness variation of the multilayer structure.

Figure 11B:
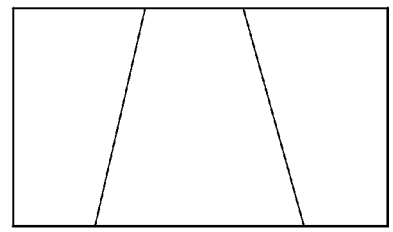

FIG. 11(B) further shows the segmenting section has two cross sections according to one of the embodiments of the invention. The segmenting section segments the fluids of the channels into three fluid segments. The segments are then transported over different channel-switching sections. The thicknesses of layers of the multilayer structure may be controlled in addition to define the multiple (e.g. triple) of the layers thereof.

Figure 11C:
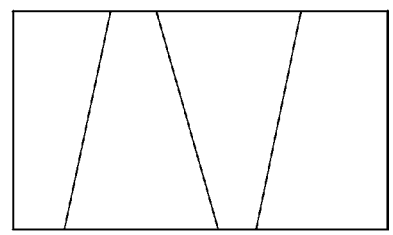
Figure 11D:
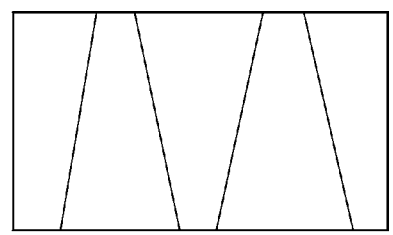
Figure 12A:
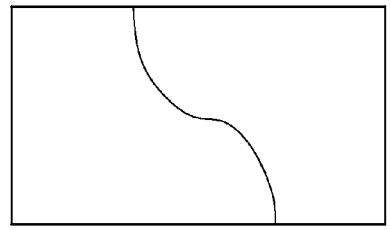
FIGS. 12(A)(B)(C)(D) show the schematic diagrams of some more segmenting types of the feedblock multiplier according to one embodiment of the invention.
Figure 12B:
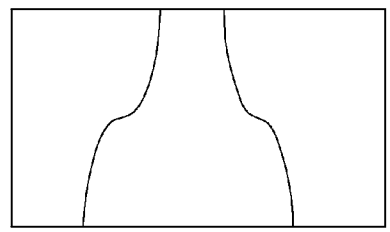
Figure 12C:
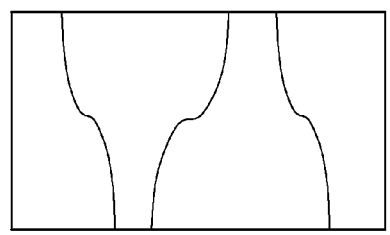
Figure 12D:
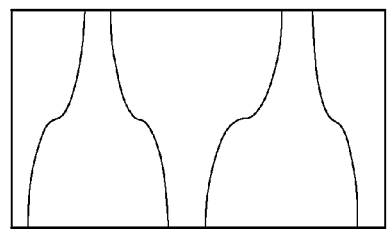

The embodiment of the segmenting section is configured to have three cross sections shown in FIG. 11(C), and four described in FIG. 11(D).

The cross section of the segmenting section of the feedblock multiplier may be designed as a curved surface, or other type of irregular cross section. The cross sections shown in 12(A), 12(B), 12(C), or 12(D) describe the various types of the cross sections. The cross section is configured to define the multiple of layers and the thickness-gradient variation in the manufacturing process.

Figure 13:
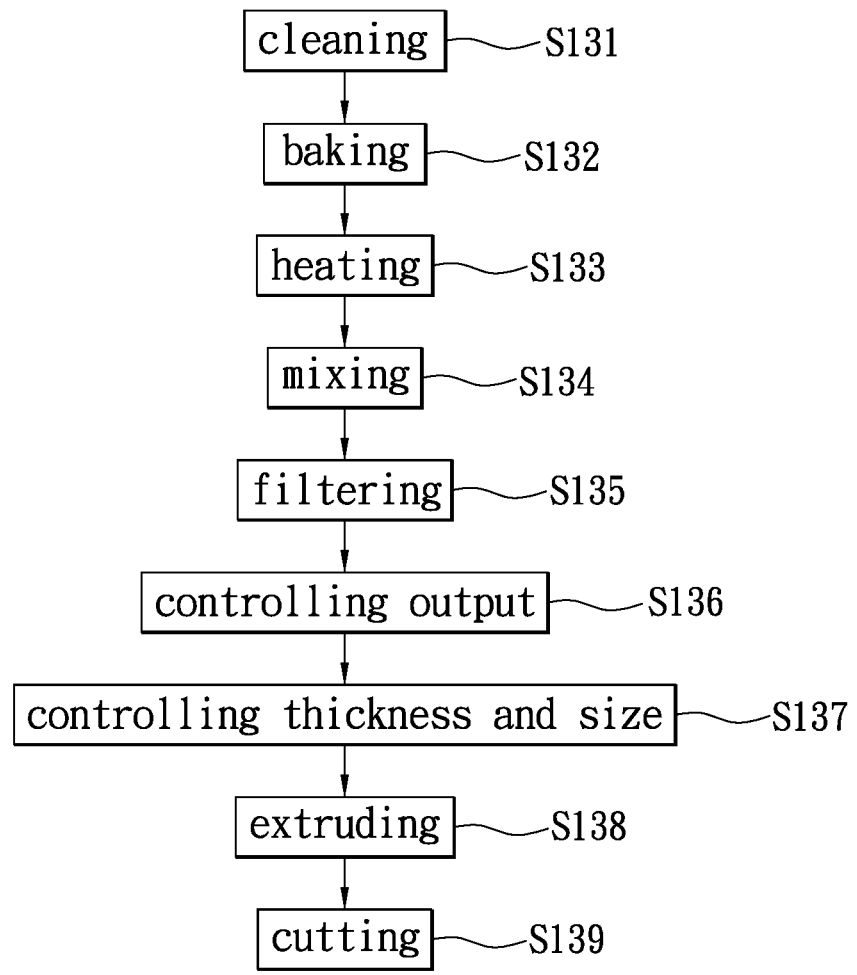
FIG. 13 is a flow chart illustrating the co-extrusion process.

FIG. 13 describes a co-extruding process for manufacturing the multilayer structure. The co-extruding process includes firstly feeding materials through a main feeding zone, a secondary feeding zone and/or other further feeding zones. The next steps in the process are to perform dust-cleaning on the materials (step S131), to conduct drying and baking (step S132), heating (step S133), mixing and mastication to the materials (step S134). The mentioned mixing step performed onto the polymer is usually requiring a heater to heat the polymer to be melt type according to their mechanical or thermal properties (step S115).

The mixing process may be implemented by a Hunschel Mixer, a Ribbon Mixer, or a Roller Mixer for fully mixing the materials. The mixed materials then undergo the mastication process by a machine for gelatinizing the polymers. The co-polymers after the processes of mixing and mastication are then filtered for filtering out the inside impurities by a filter (step S135). Next, a gear wheel controls the extrudate of the whole process (step S136).

After the describing the extruding process, the feedblock multiplier with thickness-gradient variation in accordance with the present invention is used to conduct feedblock and multiplying in various steps for defining number of layers, the thicknesses of the layers, and the size of the final product (step S137). The final extruding process is performed on the product (step S138), and the product is cut as required (step S139).

It is noted that, the melt-type polymers as the materials fed into the feedblock multiplier undergo a feedblock, multiplying, and co-extruding processes by an extrusion die, the temperature and thicknesses of the layers of the final product may be much uniform. It is advantageous that the thickness and size through the extruding process of the whole product can be effectively controlled.

Figure 14:
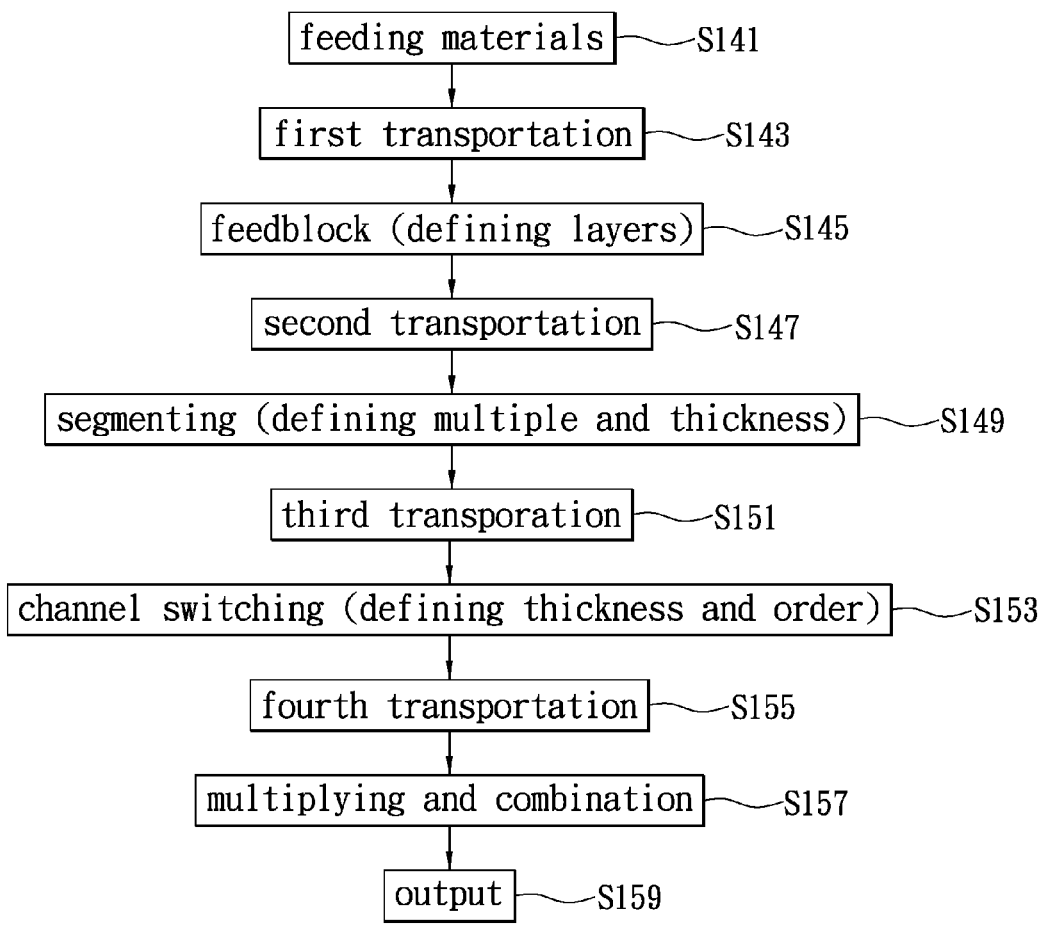
FIG. 14 is a flow chart describing the method for manufacturing the multilayer by the feedblock multiplier of the present invention.

FIG. 14 describes the method for manufacturing the feedblock multiplier according to one of the embodiments of the present invention. The feedblock and multiplying steps include a first step of feeding materials (step S141), transporting the materials to a feedblock section (first transportation, step S143), and the device dividing the materials into several fluids over channels (step S145). In the meantime, the feedblock process in this early stage defines the base layers of the multilayer structure.

The fluids are then transported to a segmenting section (second transportation, step S147). The segmenting section, through the required cross section, performs segmentation to the fluids (step S149). The fluids are segmented into several fluid segments based on the configuration of the cross section. The multiple of the layers are determined accordingly. In usual, the value of multiple multiplied by the number of layers after feedblock process is the number of layers of the final multilayer structure. The multilayer structure may be designed to combine the other functional layers or structure by additional processes.

The multiple channels of the channel-switching section are used to transport the fluid segments after segmenting process (third transportation, step S151). The thickness variation of the product may be configured through the structural design of the device. The relative positions of the layers of the structure may be defined at the same moment (step S153).

The fluids over channels of the channel-switching section are transported (fourth transportation, step S155), and combined at the multiplier section (step S157). The each channel may have its unique design of the thickness, and the output matter of the channels may have specified layers, relative positions, and thickness variation (step S159).

A front feedblock may be disposed at the front end of the feedblock multiplier in accordance with the present invention in an exemplary embodiment. This front feedblock may be coupled to the feedblock section at the front end of the feedblock multiplier, such as the element numeral 701 of FIG. 7, so as to form a feedblock system. Then the device receives the input materials over a plurality of layers from the front feedblock. These input layers of materials are thereby forming the multilayer film with thickness-gradient variation by the feedblock multiplier.

Figure 15A:
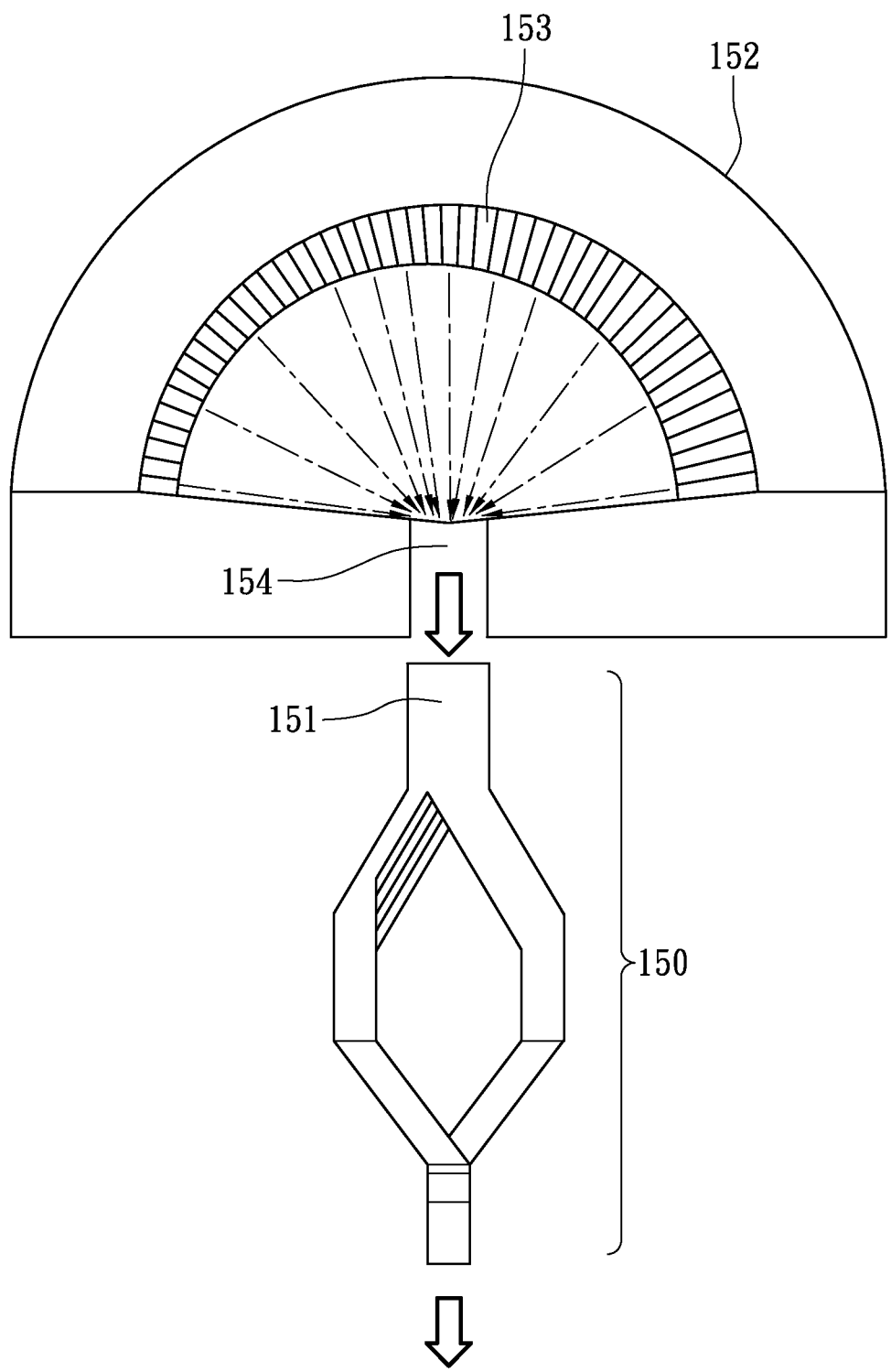
FIGS. 15A, 15B, 15C shows a feedblock system formed by a feedblock multiplier according to the embodiment of the present invention.
Figure 15B:
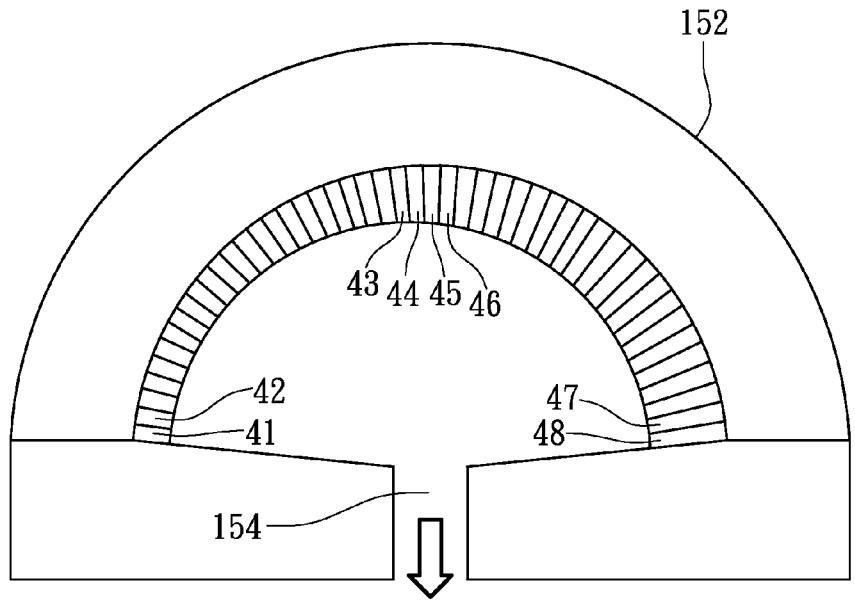
Figure 15C:
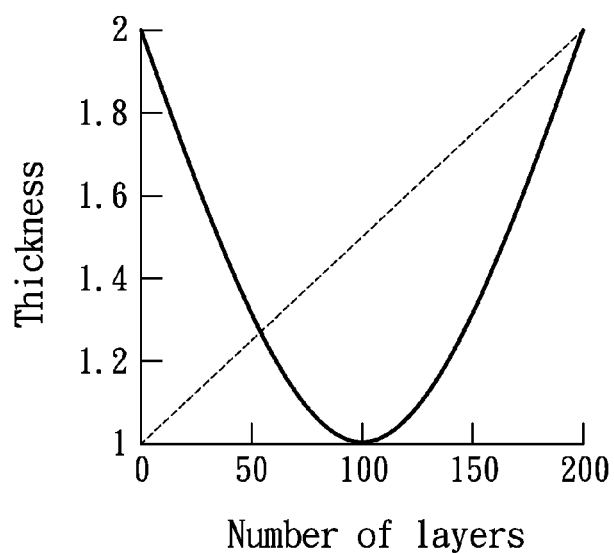
Figure 16A:
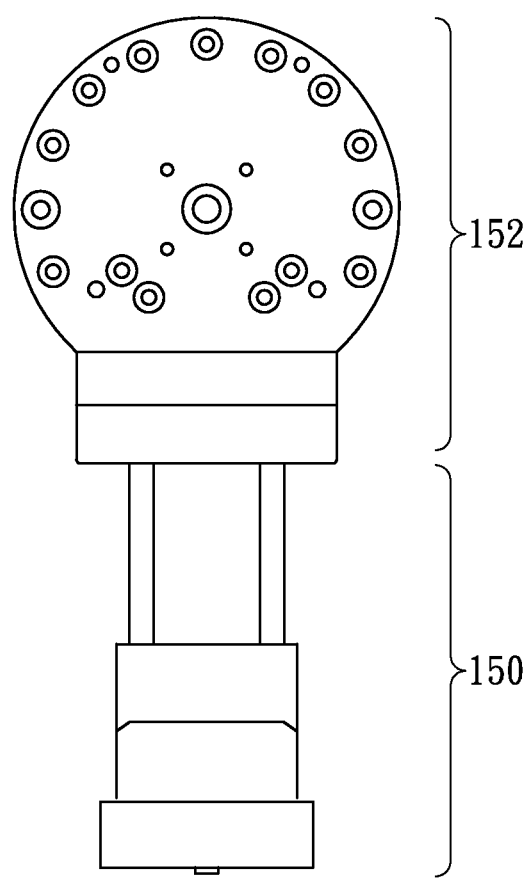
FIGS. 16A, 16B show outward views of the feedblock system in accordance with the embodiment of the present invention.
Figure 16B:
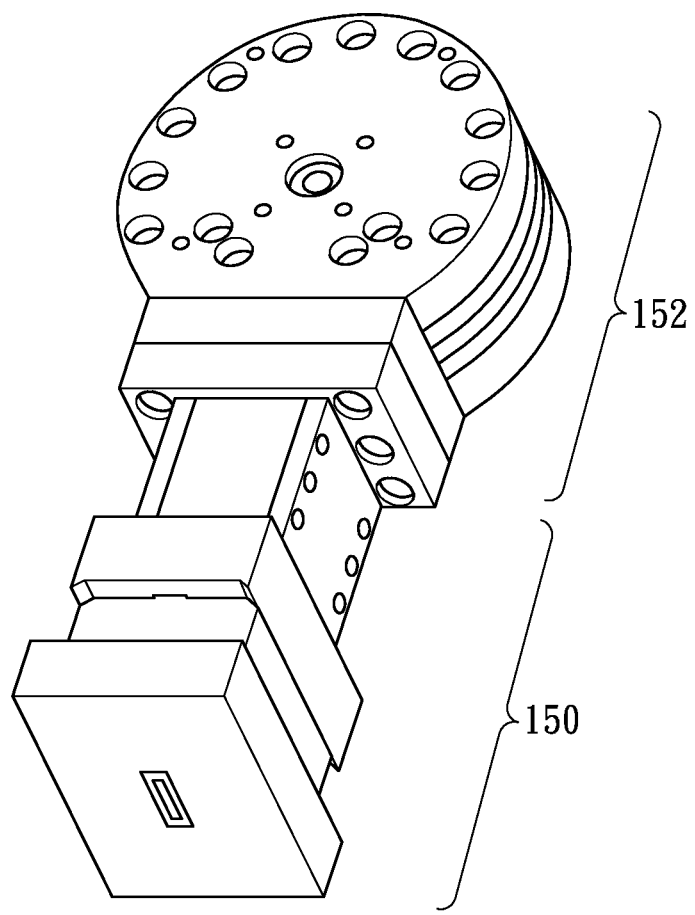

The embodiments of the feedblock system are referred to the schematic diagrams shown in FIGS. 15A, 15B, and 15C, in view of the appearance of the structure of FIGS. 16A and 16B.

As an example shown in FIG. 15A, the front section of the feedblock system is a discoidal front feedblock 152. The front feedblock 152 is the discoidal structure having internal super-multiple micro-channels. One of the main objectives of the front feedblock 152 is to combine, separate, and re-arrange the two or more materials of fluids. The interior of the discoidal front feedblock 152 is composed of multiple discoidal molds. FIG. 16A shows an outline of the embodiment of the combination of the front feedblock 152 and the feedblock multiplier 150. FIG. 16B shows a detail structure of the disc-like front feedblock 152 formed of five discoidal matters. The main functions of the structure include combining the feeding polymeric materials, separating the micro-channels, and re-arranging the channels.

In detail, the inmost disc structure of the micro-channels of the discoidal mold of the front feedblock 152 shown in FIG. 15A includes a plurality of radial-like channels. Those radial channels receive the feeding polymers through an input section. The structure of inner channels 153 is served to divide the input materials into multiple layers of fluids. The channels 153 may have different thicknesses, lengths or widths. The configuration of the channels 153 dominates the flowing speed of the fluids over the channels, feedback back-pressure and shearing force of the flowing fluids. The sizes of the channels 153 may be variously configured as required. The variation of the channels 153 results in the variant thicknesses of layers of the final extrudate. Exemplarily, the widths of the channels 153 are configured to get smaller or bigger. However, the variation may cause the device to meet asymmetric and great flowing rate different fluids. The device may be damaged as meeting the disorder. The final extruding product may also meet the problems of stain and color spot because of the uneven thicknesses of the internal layers within the film.

FIG. 15B shows one further embodiment of the present invention. The dimensions of widths and lengths of the shown channels 41 through 48 in the front feedblock 152 are altered. In particular, the channels are getting changed in accordance with U-shaped variation, especially a U-shaped symmetric form. That configuration is resulting in the relation between the thicknesses and layers of the extrudate shown in FIG. 15C.

In FIG. 15C, the shown film is a multilayer structure having around 200 layers. It shows the number of channels shown in FIG. 15A or FIG. 15B is about 200. The widths of the channels 153 are gradually smaller and getting bigger as forming the U-shaped configuration with the arrangement of the layers. On the contrary, the embodiment of FIG. 15B shows the widths of the channels 41 to 44 are gradually smaller, and the widths of the channels 45 to 48 tending to bigger. The arrangement of the channels 41 through 48 of FIG. 15B may result in the U-shaped multilayer with variant thicknesses because the fluids are extruded at the later stage when the shown main channel port 154 collects all of the outputs. The thickness of the produced film formed of polymeric fluids are configurable due to the factors such as extruding volume, flowing speed, fluid pressure, the inherent swelling phenomena of the polymers, extending speed of the film, and/or the extending rate in the manufacturing process. Therefore, the combination of the feedblock having channels with thickness-gradient variation and the feedblock multiplier 150 with bevel segmenting section is configured to produce the fluids having multiple layers with the gradient variation of thicknesses, lengths or widths.

The materials through the multiple channels 153 are combined as a multilayer structure via the main channel port 154. The multilayer structure is then input into the feedblock multiplier 150.

The assembly of the front feedblock 152 and the feedblock section 151 at the front end of the feedblock multiplier 150 forms a feedblock system. Therefore, the multilayer structure with much more layers may be possible since the feedblock system is able to provide the more layers. In the feedblock system, the front feedblock 152 produces the structure with multiple layers, and the feedblock multiplier 150 multiplies the number of layers.

To sum up the above description, the invention is related to the feedblock multiplier with thickness-gradient variation, feedblock system, method and the related structure. The feedblock multiplier combines the advantages of feedblock and multiplier, and in which a feedblock section is included to produce multiple layers with variant thicknesses, and a multiplier section is added for multiplying the number of layers. The film with multilayer structure with thickness-gradient variation can be stably manufactured. The configuration of the segmenting and channel-switching means of the device may customize the final produce so as to implement flexible design.

It is intended that the specification and depicted embodiment be considered exemplary only, with a true scope and spirit of the invention being indicated by the broad meaning of the following claims.

What is claimed is:

1. A feedblock multiplier for manufacturing multilayer structure with thickness-gradient variation, the feedblock multiplier comprising:
    an input section, wherein materials for manufacturing the multilayer structure is input to the feedblock multiplier via the input section;
    a feedblock section, connected with the input section, wherein the material are divided into a plurality of fluids in channels;
    a segmenting section defining a bevel or a curved cross section, disposed at an output end of the feedblock section, wherein the fluids are segmented into two or more fluid segments by the bevel or the curved cross section of the segmenting section and resulting in the multilayer structure with thickness-gradient variation during manufacturing process when the fluids are transported over the plurality of channels to the segmenting section at the same time, and each fluid segment includes the fluid segmented in the channels;
    two or more channel-switching sections, connected to the segmenting section, wherein the every channel-switching section is with relative transportation positions of the channels in segments, and the every fluid segment flows over one corresponding channel-switching section; wherein the thicknesses of the channels over the channel-switching sections have gradient variation;
    a multiplier section, connected to an output end of the channel-switching sections and combined with more than one channel in the channel-switching sections, outputting the multilayer structure with stacked multiple layers, wherein the outputted multilayer structure has thickness-gradient variation; and
    an extruding section for co-extruding the outputted multilayer structure with the thickness-gradient variation, connected with output end of the multiplier section.

2. The feedblock multiplier of claim 1, wherein the channel-switching section includes a first channel-switching section and a second channel-switching section, and the two sections have the same number of channels; and the two fluid segments are respectively flowed through the first channel-switching section and the second channel-switching section.

3. The feedblock multiplier of claim 1, wherein the multiplier section is used to stack up the channels of the two or more channel-switching sections after switching the relative transportation positions and their transportation positions entering the multiplier section are different from the relative positions of the channels previously over the feedblock section.

4. A feedblock system made by combining a feedblock multiplier with thickness-gradient variation according to claim 1 and a front feedblock.

5. The feedblock system of claim 4, wherein the fluid outputted from the front feedblock is inputted to a feedblock section of the feedblock multiplier.

6. The feedblock system of claim 4, wherein the front feedblock is a disc-like feedblock having a plurality of internal radial channels.

7. The feedblock system of claim 6, wherein the thicknesses of the plurality of channels are variant.

8. The feedblock system of claim 6, wherein the lengths of the channels are variant.

* * * * *